United States Patent
Onodera et al.

(10) Patent No.: US 7,716,920 B2
(45) Date of Patent: May 18, 2010

(54) ENGINE EXHAUST GAS PURIFICATION DEVICE

(75) Inventors: Takao Onodera, Fujisawa (JP); Wei Wu, Fujisawa (JP); Takashi Haseyama, Fujisawa (JP); Takuro Iwashita, Fujisawa (JP); Atsushi Matsunuma, Fujisawa (JP); Shigeru Ikeda, Fujisawa (JP); Toshio Miyazaki, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 26 days.

(21) Appl. No.: 11/099,029

(22) Filed: Apr. 5, 2005

(65) Prior Publication Data
US 2005/0223697 A1    Oct. 13, 2005

(30) Foreign Application Priority Data
Apr. 9, 2004 (JP) ............... 2004-115815

(51) Int. Cl.
*F01N 3/00* (2006.01)
(52) U.S. Cl. .............. 60/295; 60/278; 60/285; 60/297; 60/311
(58) Field of Classification Search ......... 60/278, 60/297, 311, 300, 276, 285, 295
See application file for complete search history.

(56) References Cited

U.S. PATENT DOCUMENTS

| 4,345,431 | A  | * | 8/1982  | Suzuki et al.    | 60/286 |
| 4,452,040 | A  |   | 6/1984  | Kobashi          | 60/274 |
| 5,042,248 | A  | * | 8/1991  | Abthoff et al.   | 60/274 |
| 6,293,095 | B1 | * | 9/2001  | Yamamoto et al.  | 60/286 |
| 6,438,948 | B2 | * | 8/2002  | Ono et al.       | 60/311 |
| 6,490,857 | B2 | * | 12/2002 | Sasaki           | 60/278 |
| 6,497,095 | B2 | * | 12/2002 | Carberry et al.  | 60/295 |
| 6,536,209 | B2 | * | 3/2003  | Fluga et al.     | 60/284 |

(Continued)

FOREIGN PATENT DOCUMENTS

DE    102 25 208    2/2003

(Continued)

OTHER PUBLICATIONS

EP 05 00 7097 European Search Report Oct. 30, 2006.

*Primary Examiner*—Thomas E Denion
*Assistant Examiner*—Diem Tran
(74) *Attorney, Agent, or Firm*—McCormick, Paulding & Huber LLP

(57) ABSTRACT

The present invention provides an engine exhaust gas purification device comprising a filter B provided in an exhaust passage (10) of an engine (1) for trapping particulate matter contained in the exhaust gas, a catalyst A for regenerating the filter B by burning the particulate matter trapped in the filter B, an EGR valve (8) provided in an EGR passage (7) linking the intake side and exhaust side of the engine 1, an injector (2) for injecting fuel into a cylinder, and control unit (20) for controlling the injector (2) and EGR valve (8). During regeneration of the filter B, the control unit (20) close the EGR valve (8) when fuel injection from the injector (2) is controlled to supply unburned fuel components to the catalyst A, and open the EGR valve (8) when no fuel is injected from the injector (2) upon a request for speed reduction or the like. In so doing, residual unburned fuel components in the EGR passage (7) are scavenged by air.

14 Claims, 2 Drawing Sheets

U.S. PATENT DOCUMENTS

| | | | |
|---|---|---|---|
| 6,574,956 B1 * | 6/2003 | Moraal et al. | 60/295 |
| 6,594,990 B2 * | 7/2003 | Kuenstler et al. | 60/295 |
| 6,598,387 B2 * | 7/2003 | Carberry et al. | 60/297 |
| 6,758,037 B2 * | 7/2004 | Terada et al. | 60/295 |
| 6,826,903 B2 * | 12/2004 | Yahata et al. | 60/278 |
| 7,013,638 B2 * | 3/2006 | Hiranuma et al. | 60/286 |
| 7,021,051 B2 * | 4/2006 | Igarashi et al. | 60/295 |

FOREIGN PATENT DOCUMENTS

| | | |
|---|---|---|
| DE | 102 15 479 | 10/2003 |
| EP | 0 974 747 | 1/2000 |
| EP | 1 382 812 | 1/2004 |
| JP | 58-051235 | 3/1983 |
| JP | 03-067014 | 3/1991 |
| JP | 5-17112 | 3/1993 |
| JP | 05-106518 | 4/1993 |
| JP | 05-133285 | 5/1993 |
| JP | 2003-027921 | 1/2003 |

* cited by examiner

ENGINE EXHAUST GAS PURIFICATION DEVICE

CROSS REFERENCE TO RELATED APPLICATION

The applicants hereby claim foreign priority benefits under U.S.C. §119 of Japanese Patent Application No. 2004-115815 filed on Apr. 9, 2004, and the content of which is herein incorporated by reference.

BACKGROUND OF THE INVENTION

1. Field of the Invention

The present invention relates to an exhaust gas purification device for an engine, and more particularly to an engine exhaust gas purification device comprising a filter for trapping particulate matter contained in the exhaust gas, and an EGR (exhaust gas recirculation) valve for recirculating the exhaust gas to an intake side.

2. Description of the Related Art

Restrictions on the exhaust gas of diesel engines become stricter year by year, and hence the discharge amount of particulate matter (PM) contained in the exhaust gas must be suppressed. A continuous regeneration diesel particulate filter (DPF) exists as a device for removing PM from exhaust gas.

As shown in FIG. 2, in a continuous regeneration DPF, a filter c for trapping the PM in the exhaust gas is provided in an exhaust passage b of an engine a. The PM trapped in the filter c is burned continuously according to the temperature of the exhaust gas, and thus the filter c self-regenerates. However, when the exhaust gas temperature is low, for example under low speed, low load conditions, the PM trapped in the filter c cannot be burned by the temperature of the exhaust gas, and hence regeneration is not possible. As a result, the PM continues to accumulate in the filter c, causing the filter c to become clogged and the exhaust pressure to rise.

To solve this problem, a technique of using a catalyst-carrying filter c' as the filter c such that the unburned components of the fuel are supplied to this catalyst-carrying filter c' is known. According to this technique, the catalyst-carrying filter c' is activated to rise in temperature by the unburned fuel components, and hence the catalyst-carrying filter c' can be regenerated forcibly even when the exhaust gas temperature is comparatively low, for example under low speed, low load conditions.

Supply of the unburned fuel components to the catalyst-carrying filter c' has been achieved by the present inventor and so on through multi-injection and post-injection from an injector d into the cylinder. Multi-injection involves performing one or more sub-injections following a main injection while the flame generated by the main injection continues to burn. Post-injection involves performing one or more sub-injections following the main injection after the flame generated by the main injection has died out.

If an EGR valve e is opened to implement exhaust gas recirculation during forcible regeneration of the catalyst-carrying filter c' through such multi-injection and post-injection, the unburned fuel components produced by the multi-injection and post-injection are recirculated to the intake side from the exhaust side through an EGR passage f. As a result, the unburned components turn into a tar-like substance and stick to an intake manifold g and the like. In the worst case, this may lead to blockages. Hence, a system in which the EGR valve e is closed and the exhaust gas is not recirculated during forcible regeneration of the catalyst-carrying filter c' has been considered.

However, it was discovered that with such a system, although unburned components can indeed be prevented from adhering to and accumulating in the intake manifold g by closing the EGR valve e, exhaust gas remains in the EGR passage f, an EGR cooler h, and so on, which are disposed further upstream in the flow direction of the EGR gas than the closed EGR valve e, and hence the unburned components turn into a tar-like substance and accumulate in these parts h, f.

Note that Japanese Patent Application Laid-open Publication S58-51235 (Patent Document 1) and Japanese Patent Application Laid-open Publication H3-67014 (Patent Document 2) are known as related prior art documents. However, in the device disclosed in Patent Document 1, the filter c is self-regenerated by controlling an intake throttle valve i provided in an intake passage h to close, and in the device disclosed in Patent Document 2, in addition to the control described in Patent Document 1, self-regeneration of the filter c is improved in efficiency by opening the EGR valve e to reduce the amount of new intake air, thereby increasing the temperature of the exhaust gas passing through the filter c. Hence the technological premise of these documents differs from that of the system described above, in which self-regeneration is performed by raising the temperature of the catalyst-carrying filter c' through multi-injection and post-injection.

SUMMARY OF THE INVENTION

An object of the present invention is to provide an engine exhaust gas purification device which prevents unburned fuel components from accumulating in an EGR passage by scavenging the EGR passage as needed.

A first invention designed to achieve this object is an engine exhaust gas purification device comprising a filter provided in an exhaust passage of an engine, for trapping particulate matter contained in exhaust gas, a catalyst provided on the upstream side of the filter and/or on the surface of the filter, for regenerating the filter, an EGR valve provided in an EGR passage linking the intake side and exhaust side of the engine, an injector for injecting fuel into a cylinder of the engine, and control means for controlling the injector and EGR valve. During regeneration of the filter, the control means close the EGR valve when fuel injection from the injector is controlled to supply unburned fuel components to the catalyst, and open the EGR valve when no fuel is injected from the injector upon a request for speed reduction or the like.

According to this invention, if fuel ceases to be injected from the injector due to a speed reduction request or the like issued while fuel injection from the injector is being controlled such that unburned fuel components are supplied to the catalyst to regenerate the filter, the EGR valve, which has been closed up to this point, is opened. As a result, the EGR passage is scavenged by air that is not mixed with fuel, and hence residual unburned components in the EGR passage are scavenged by this air in an appropriate manner.

During regeneration of the filter, the control means may control an intake throttle valve provided in an intake passage of the engine to close. In so doing, the amount of new intake air is reduced during regeneration of the filter, and hence reductions in the temperature of the exhaust gas are suppressed, reductions in the temperature of the catalyst and/or the filter are suppressed, and a consequent deterioration in the regeneration capability of the filter is prevented.

A second invention is an engine exhaust gas purification device comprising an intake throttle valve provided in an intake passage of an engine, a filter provided in an exhaust passage of the engine, for trapping particulate matter contained in exhaust gas, a catalyst provided on the upstream side of the filter and/or on the surface of the filter, for regenerating the filter, an EGR valve provided in an EGR passage linking the intake side and exhaust side of the engine, an injector for injecting fuel into a cylinder of the engine, and control means for controlling the injector, the EGR valve, and the intake throttle valve. During regeneration of the filter, the control means basically supply unburned fuel components to the catalyst by controlling fuel injection from the injector, and when no fuel is injected from the injector during exceptions such as a request for speed reduction, the control means control the intake throttle valve to close, and control the EGR valve to open.

According to this invention, if fuel ceases to be injected from the injector due to a speed reduction request or the like issued while fuel injection from the injector is being controlled such that unburned fuel components are supplied to the catalyst to regenerate the filter, the intake throttle valve is controlled to close, thereby reducing the amount of new intake air such that reductions in the temperature of the catalyst and/or the filter are suppressed. Furthermore, the EGR valve is controlled to open at the same time as the intake throttle valve is controlled to close, and hence negative pressure inside the cylinder, which is generated when the intake throttle valve is controlled to close, is reduced by controlling the EGR valve to open. As a result, oil loss via the piston rings and oil loss via the guides can be suppressed. Moreover, by controlling the EGR valve to open, residual unburned components in the EGR passage are scavenged by air.

DESCRIPTION OF THE PREFERRED EMBODIMENTS

A preferred embodiment of the present invention will be described below in detail on the basis of the attached drawings.

Figure 1:
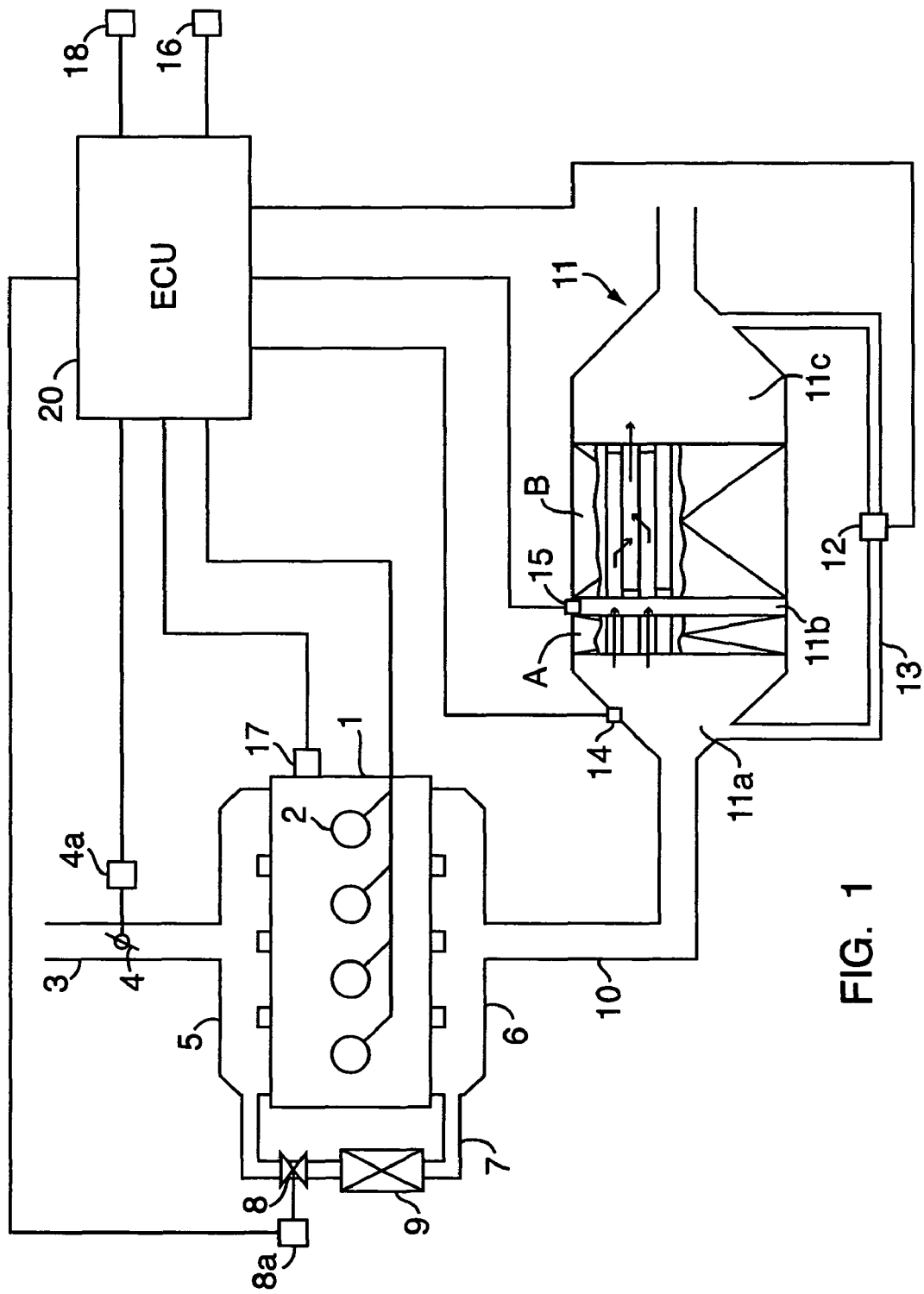
FIG. 1 is a system diagram of an engine exhaust gas purification device according to a preferred embodiment of the present invention.
Figure 2:
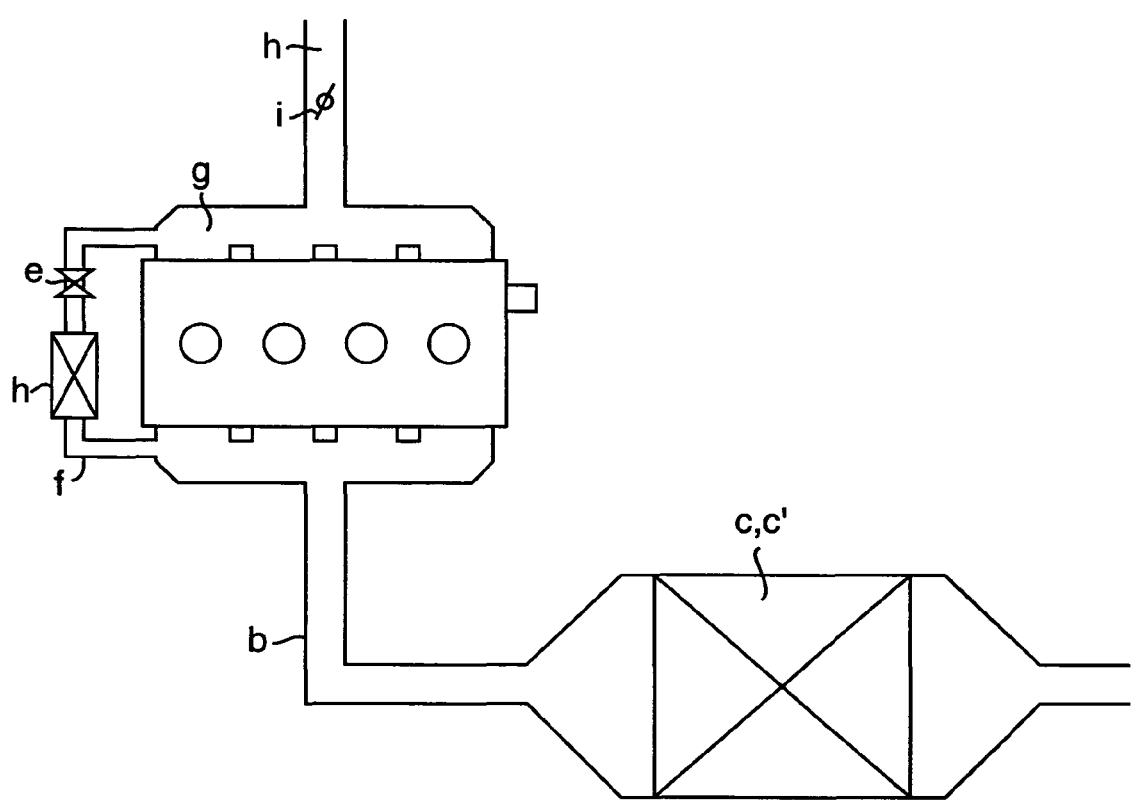
FIG. 2 is a system diagram of a conventional example of an engine exhaust gas purification device.

As shown in FIG. 1, an injector 2 (in the illustrated example, an injector of a common rail-type fuel injection system) is attached to a cylinder head of a diesel engine 1 installed in a vehicle. The injector 2 receives signals from an engine control unit (ECU) 20 serving as control means to control the injection timing and injection amount.

An intake throttle valve 4 is provided in an intake passage 3 of the engine 1 for varying the passage cross section. A driving portion 4a of the intake throttle valve 4 receives signals from the ECU 20 to open/close control the intake throttle valve 4.

An intake manifold 5 and an exhaust manifold 6 of the engine 1 are linked by an EGR passage 7. An EGR valve 8 is provided in the EGR passage 7 for varying the passage cross section. A driving portion 8a of the EGR valve 8 receives signals from the ECU 20 to open/close control the EGR valve 8. An EGR cooler 9 is provided in the EGR passage 7 upstream of the EGR valve 8 (on the upstream side of the EGR gas flow direction) for cooling EGR gas which passes through the passage 7.

An oxidation catalyst A and a catalyst-carrying filter B are provided in series on an exhaust passage 10 of the engine 1. The oxidation catalyst A and catalyst-carrying filter B are accommodated in a storage case 11 interposed in the exhaust passage 10. The oxidation catalyst A is disposed on the upstream side of the exhaust gas flow, and the catalyst-carrying filter B is disposed on the downstream side of the oxidation catalyst A at a predetermined remove therefrom. The interior of the storage case 11 is partitioned into an upstream chamber 11a, an intermediate chamber 11b, and a downstream chamber 11c by the oxidation catalyst A and catalyst-carrying filter B.

The oxidation catalyst A is constituted by a block body composed entirely of an oxidation catalyst substance, and a plurality of pores connecting the upstream chamber 11a to the intermediate chamber 11b are provided in this block body. The oxidation catalyst A rises in temperature when supplied with unburned fuel components, thereby heating the exhaust gas which flows into the downstream side catalyst-carrying filter B. Thus the oxidation catalyst A functions to raise the temperature of the catalyst-carrying filter B. Note that the oxidation catalyst A assists in raising the temperature of the catalyst-carrying filter B, and therefore may be omitted, as will be described hereafter.

The catalyst-carrying filter B comprises a plurality of pores connecting the intermediate chamber 11b to the downstream chamber 11c. The upstream end and downstream end of adjacent pores are blocked alternately, and a catalyst is carried on the inner peripheral surface of each pore. The catalyst-carrying filter B traps the PM in the exhaust gas on the inner peripheral surface of the pores, and rises in temperature when supplied with unburned fuel components so that the trapped PM is burned. Thus the catalyst-carrying filter B regenerates.

The differential pressure between the upstream chamber 11a and downstream chamber 11c is detected by a differential pressure sensor 12. More specifically, the upstream chamber 11a and downstream chamber 11c are connected by a pipe 13, and the differential pressure sensor 12 is provided at a point on the pipe 13 for detecting the differential pressure between the left and right of the pipe 13. The detection value of the differential pressure sensor 12 is outputted to the ECU 20.

A catalyst inlet exhaust gas temperature sensor 14 is provided in the upstream chamber 11a for detecting the temperature of the exhaust gas at the inlet to the oxidation catalyst A, and a filter inlet exhaust gas temperature sensor 15 is provided in the intermediate chamber 11b for detecting the temperature of the exhaust gas at the inlet to the catalyst-carrying filter B. The detection values of these exhaust gas temperature sensors 14, 15 are outputted to the ECU (electronic control unit) 20.

In addition to the detection values of the differential pressure sensor 12 and exhaust gas temperature sensors 14, 15, signals from an accelerator position sensor 16 for detecting the opening of an accelerator pedal, signals from a rotation speed sensor 17 for detecting the engine rotation speed, and signals from a distance sensor 18 for detecting the traveled distance of the vehicle are also inputted respectively into the ECU 20.

When the engine 1 is operative, the PM in the exhaust gas is trapped in the catalyst-carrying filter B, and the ECU 20 determines in the following manner whether or not to regenerate the catalyst-carrying filter B according to whether a fixed amount of PM has accumulated therein. More specifically, the distance traveled by the vehicle from the previous regeneration of the catalyst-carrying filter B to the present time is detected by the distance sensor 18, and if the traveled distance has reached a predetermined distance, it is estimated that the fixed amount of PM has accumulated in the catalyst-carrying filter B and determined that the catalyst-carrying filter B should be regenerated.

However, depending on the traveling conditions of the vehicle, the fixed amount of PM may become trapped in the catalyst-carrying filter B before the traveled distance of the vehicle reaches the predetermined distance. Hence the differential pressure is detected by the differential pressure sensor 12 constantly or at predetermined time intervals, and when the differential pressure exceeds a predetermined differential pressure, it is estimated that the fixed amount of PM has accumulated in the catalyst-carrying filter B and determined that the catalyst-carrying filter B should be regenerated.

When it is determined that the catalyst-carrying filter B is not to be regenerated, the ECU 20 outputs a signal to the injector 2 to perform normal fuel injection on the basis of a signal from the accelerator position sensor 16 and a signal from the rotation speed sensor 17. When it is determined that the catalyst-carrying filter B should be regenerated, regeneration is performed by switching between normal injection, multi-injection, and post-injection in the following manner in accordance with the detection values of the catalyst inlet exhaust gas temperature sensor 14 and filter inlet exhaust gas temperature sensor 15. Multi-injection and post-injection are as described in the background art section.

Multi-injection and post-injection are performed when fuel injection is executed during normal traveling, idling, or the like, but are not performed when fuel injection is halted at times such as when the accelerator pedal is not depressed during downhill traveling and when the accelerator pedal is not depressed in order to reduce speed. Multi-injection and post-injection are performed as sub-injections following the main injection, and therefore are naturally not performed when the fuel supply is cut and the main injection is not performed.

When the temperature of the exhaust gas detected by the catalyst inlet exhaust gas temperature sensor 14 is lower than a first predetermined temperature (the activation temperature of the oxidation catalyst A, for example 250° C.), first a multi-injection is performed. As a result, waste heat that is not converted into motive power is supplied to the oxidation catalyst A, causing the temperature of the oxidation catalyst A to rise to its activation temperature.

A post-injection is then performed, whereby exhaust gas containing unburned components is supplied to the oxidation catalyst A and catalyst-carrying filter B. In so doing, the temperature of the exhaust gas is raised by the oxidation catalyst A to become high-temperature gas which is supplied to the catalyst-carrying filter B, and thus the temperature of the catalyst-carrying filter B is raised to its activation temperature (approximately 500 to 600° C.). As a result, the PM trapped in the catalyst-carrying filter B is burned, and the catalyst-carrying filter B is forcibly regenerated.

Note that multi-injection may be performed at the same time as post-injection. Moreover, post-injection may be performed after the detected temperature of the filter inlet exhaust gas temperature sensor 15 has reached a second predetermined temperature (approximately 300° C., for example).

When the catalyst-carrying filter B is regenerated by performing multi-injection and post-injection, the EGR valve 8 is closed by the ECU 20, and hence exhaust gas recirculation to the intake side is halted. If the EGR valve 8 is open, the unburned components generated by the post-injection and multi-injection are recirculated to the intake side, where the unburned components turn into a tar-like substance which becomes adhered to the intake manifold 5 and so on. Therefore, the EGR valve 8 is closed to avoid such a situation.

Note, however, that even when the EGR valve 8 is closed, exhaust gas remains in the EGR passage 7, EGR cooler 9, and so on, which are disposed upstream of the closed EGR valve 8 in the EGR gas flow direction, and hence the unburned fuel turns into a tar-like substance and accumulates in these parts 7, 9.

Hence in this embodiment, when fuel is not injected from the injector 2 during regeneration of the catalyst-carrying filter B, for example when the accelerator pedal is not depressed in order to reduce the vehicle speed or the like, the EGR valve 8, which has been closed up to this point, is opened by the ECU 20.

In so doing, the injector 2 does not inject any fuel, and hence air (exhaust gas) that is not mixed with fuel is recirculated to the intake manifold 5 from the exhaust manifold 6 through the EGR passage 7. Thus the residual unburned components in the EGR passage 7 and EGR cooler 9 can be scavenged in an appropriate manner by the air that is not mixed with fuel. As a result, unburned components can be prevented from accumulating in tar form in the EGR passage 7 and EGR cooler 9.

More specifically, when fuel injection is performed during regeneration of the catalyst-carrying filter B, unburned components are supplied to the catalyst-carrying filter B by performing multi-injection and post-injection, and the EGR valve 8 basically remains fully closed to prevent the unburned components from adhering to and accumulating in the intake manifold 5. Then, when fuel injection is not performed through the injector 2 at times such as when the accelerator pedal is not depressed, the EGR valve 8 is opened so that the EGR passage 7 and EGR cooler 9 can be scavenged by air that is not mixed with fuel, thereby removing the residual unburned components from the EGR passage 7 and EGR cooler 9.

Further, the intake throttle valve 4 may be controlled by the ECU 20 to close (including a fully closed state) during regeneration of the catalyst-carrying filter B. Here, the intake throttle valve 4 being "fully closed" indicates that a little intake air may pass therethrough. In so doing, the amount of new intake air is reduced, and hence reductions in the temperature of the exhaust gas passing through the catalyst-carrying filter B can be suppressed. As a result, reductions in the temperature of the catalyst-carrying filter B are suppressed, and a deterioration in the regeneration capability thereof is prevented.

It is possible to execute this closing control of the intake throttle valve 4 only when the EGR valve 8 is closed (i.e. during multi-injection and post-injection). The reason for this is that the unburned fuel generated by the post-injection and multi-injection may be supplied to the catalyst-carrying filter B without reducing the concentration thereof by controlling the intake throttle valve 4 to close such that the amount of new intake air is reduced.

It is also possible to control the intake throttle valve 4 to close (including a fully closed state) and to control the EGR valve 8 to open when no fuel is injected during regeneration of the catalyst-carrying filter B. In so doing, the amount of new intake air is reduced by closing the intake throttle valve 4, and hence reductions in the temperature of the catalyst-carrying filter B can be suppressed. Simultaneously, negative pressure inside the cylinder, which is generated when the intake throttle valve 4 is closed, can be reduced by opening the EGR valve 8 such that the intake manifold 5 and exhaust manifold 6 are connected, and hence oil loss via the piston rings and oil loss via the guides are suppressed within the cylinder.

More specifically, if the EGR valve 8 is maintained in a closed state when the intake throttle valve 4 is closed, the negative pressure inside the cylinder increases due to the closed state of the intake throttle valve 4, causing oil loss via the piston rings and oil loss via the guides, which results in an increase in fuel consumption. By opening the EGR valve 8 at the same time as the intake throttle valve 4 is closed, the negative pressure inside the cylinder is reduced. As a result, oil loss via the piston rings and oil loss via the guides are suppressed, leading to a reduction in oil consumption.

Here, oil loss via the piston rings signifies that oil in the crank case passes between the cylinder and piston and moves into the combustion chamber above the piston, whereas oil loss via the guides indicates that oil in the cylinder head passes between the bulb stem, bulb guide, and so on, and moves into the combustion chamber.

Further, the EGR valve 8 is open when no fuel is injected through the injector 2, and therefore by closing the intake throttle valve 4 and opening the EGR valve 8 when no fuel is injected during regeneration of the catalyst-carrying filter B, the residual unburned components in the EGR passage 7 and EGR cooler 9 can be scavenged by air that is not mixed with fuel.

The present invention is not limited to the embodiment described above.

For example, in the embodiment described above, the oxidation catalyst A and catalyst-carrying filter B are provided in the storage case 11, but a constitution is also possible in which only the catalyst-carrying filter B is provided, and the oxidation catalyst A is omitted. It is also possible with this constitution to raise the temperature of the catalyst-carrying filter B to a regeneration temperature through multi-injection and/or post-injection.

A constitution is also possible in which the oxidation catalyst A is provided in the storage case 11 and a filter which does not carry a catalyst is provided downstream thereof. Likewise with this constitution, the temperature of the filter can be raised to a regeneration temperature by raising the temperature of the oxidation catalyst A through multi-injection and or post-injection.

Further, the injector 2 need not be a common rail-type injector. Also, instead of the differential pressure sensor 12, pressure sensors may be provided in the upstream chamber Ha and downstream chamber 11*c* respectively, and the difference between their output values may be used as the differential pressure.

What is claimed is:

1. An engine exhaust gas purification device comprising:
   a filter provided in an exhaust passage of an engine, for trapping particulate matter contained in exhaust gas;
   a catalyst provided on at least one of an upstream side of the filter and a surface of the filter, for regenerating the filter;
   an EGR valve provided in an EGR passage linking an intake side and an exhaust side of the engine;
   an injector for injecting fuel into a cylinder of the engine; and
   control means for determining when the filter needs to be regenerated and for controlling the injector and the EGR valve;
   wherein, upon a determination that the filter needs to be regenerated, the control means forcibly regenerate the filter by controlling the injector to switch from performing normal injection when fuel injection is carried out to performing fuel injection that supplies unburned fuel components to the filter when fuel injection is carried out; and
   wherein the control means fully close the EGR valve during forcible regeneration while supplying unburned fuel components and open the EGR valve during forcible regeneration when fuel injection is not carried out, upon a request for speed reduction, so as to scavenge the EGR passage by air which is not mixed with fuel.

2. The engine exhaust gas purification device according to claim 1, wherein, during regeneration of the filter, the control means control an intake throttle valve provided in an intake passage of the engine to close.

3. The engine exhaust gas purification device according to claim 1, further comprising:
   a pipe linking the upstream side and a downstream side of the filter; and
   a differential pressure sensor provided at a point on the pipe, for detecting a differential pressure between the left and right of the pipe in relation to the position thereof on the pipe,
   wherein, when a detection value of the differential pressure sensor exceeds a predetermined differential pressure, the control means control fuel injection from the injector to regenerate the catalyst-carrying filter.

4. The engine exhaust gas purification device according to claim 1, wherein, during regeneration of the filter, the control means cause the injector to perform at least one form of injection from among a multi-injection, in which one or more sub-injections are performed following a main injection while a flame generated by the main injection continues to burn, and a post-injection, in which one or more sub-injections are performed following the main injection after the flame generated by the main injection has died out.

5. The engine exhaust gas purification device according to claim 4, wherein the control means first cause the injector to perform the multi-injection, and then cause the injector to perform the post-injection.

6. An engine exhaust gas purification device comprising:
   a catalyst-carrying filter provided in an exhaust passage of an engine, for trapping particulate matter contained in exhaust gas;
   an oxidation catalyst provided on an upstream side of the catalyst-carrying filter;
   an EGR valve provided in an EGR passage linking an intake side and an exhaust side of the engine;
   an injector for injecting fuel into a cylinder of the engine; and
   control means for determining when the filter need to be regenerated and for controlling the injector and the EGR valve;
   wherein, upon a determination that the catalyst-carrying filter needs to be regenerated, the control means forcibly regenerate the catalyst-carrying filter by controlling the injector to switch from performing normal injection when fuel injection is carried out to performing fuel injection that supplies unburned fuel components to the oxidation catalyst and the catalyst-carrying filter when fuel injection is carried out; and
   wherein the control means fully close the EGR valve during forcible regeneration while supplying unburned fuel components and open the EGR valve during forcible regeneration when fuel injection is not carried out, upon a request for speed reduction or the like, so as to scavenge the EGR passage by air which is not mixed with fuel.

7. The engine exhaust gas purification device according to claim 6, wherein, during regeneration of the catalyst-carrying filter, the control means control an intake throttle valve provided in an intake passage of the engine to close.

8. The engine exhaust gas purification device according to claim 6, further comprising:

a pipe linking the upstream side of the oxidation catalyst and a downstream side of the catalyst-carrying filter; and a differential pressure sensor provided at a point on the pipe, for detecting a differential pressure between the left and right of the pipe in relation to the position thereof on the pipe, wherein, when a detection value of the differential pressure sensor exceeds a predetermined differential pressure, the control means control fuel injection from the injector to regenerate the catalyst-carrying filter.

9. The engine exhaust gas purification device according to claim 6, wherein an EGR cooler is provided in the EGR passage for cooling EGR gas, and the EGR valve is disposed on a downstream side of the flow of the EGR gas in relation to the EGR cooler.

10. The engine exhaust gas purification device according to claim 6, comprising a catalyst inlet exhaust gas temperature sensor for detecting the temperature of the exhaust gas at the inlet to the oxidation catalyst, wherein, when the temperature of the exhaust gas detected by the catalyst inlet exhaust gas temperature sensor is lower than a first predetermined temperature during regeneration of the catalyst-carrying filter, the control means cause the injector to perform a multi-injection, in which one or more sub-injections are performed following a main injection while a flame generated by the main injection continues to burn, and close the EGR valve.

11. The engine exhaust gas purification device according to claim 10, wherein, following the multi-injection, the control means cause the injector to perform a post-injection, in which one or more sub-injections are performed following the main injection after the flame generated by the main injection has died out.

12. The engine exhaust gas purification device according to claim 11, further comprising a filter inlet exhaust gas temperature sensor for detecting the temperature of the exhaust gas at the inlet to the catalyst-carrying filter, wherein, when the temperature of the exhaust gas detected by the filter inlet exhaust gas temperature sensor is equal to or greater than a second predetermined temperature which is higher than the first predetermined temperature, the control means cause the injector to perform the post-injection.

13. An engine exhaust gas purification device comprising:
an intake throttle valve provided in an intake passage of an engine;
a filter provided in an exhaust passage of the engine, for trapping particulate matter contained in exhaust gas;
a catalyst provided on at least one of an upstream side of the filter and a surface of the filter, for regenerating the filter;
an EGR valve provided in an EGR passage linking an intake side and an exhaust side of the engine;
an injector for injecting fuel into a cylinder of the engine; and
control means for determining when the filter need to be regenerated and for controlling the injector, the EGR valve, and the intake throttle valve;
wherein, upon a determination that the filter needs to be regenerated, the control means forcibly regenerate the filter by controlling the injector to switch from performing normal injection when fuel injection is carried out to performing fuel injection that supplies unburned fuel components to the filter when fuel injection is carried out; and
wherein the control means fully close the EGR valve during forcible regeneration while supplying unburned fuel components and control the intake throttle valve to close and the EGR valve to open during forcible regeneration when fuel injection is not carried out, upon a request for speed reduction, so as to scavenge the EGR passage by air which is not mixed with fuel.

14. An engine exhaust gas purification device comprising:
an intake throttle valve provided in an intake passage of an engine;
a catalyst-carrying filter provided in an exhaust passage of the engine, for trapping particulate matter contained in exhaust gas;
an oxidation catalyst provided on an upstream side of the catalyst-carrying filter;
an EGR valve provided in an EGR passage linking an intake side and an exhaust side of the engine;
an injector for injecting fuel into a cylinder of the engine; and
control means for determining when the filter need to be regenerated and for controlling the injector, the EGR valve, and the intake throttle valve;
wherein, upon a determination that the catalyst-carrying filter needs to be regenerated, the control means forcibly regenerate the catalyst-carrying filter by controlling the injector to switch from performing normal injection when fuel injection is carried out to performing fuel injection that supplies unburned fuel components to the oxidation catalyst and the catalyst-carrying filter when fuel injection is carried out; and
wherein the control means fully close the EGR valve during forcible regeneration while supplying unburned fuel components and control the intake throttle valve to close and the EGR valve to open during forcible regeneration when fuel injection is not carried out, upon a request for speed reduction, so as to scavenge the EGR passage by air which is not mixed with fuel.

* * * * *